United States Patent [19]

Ganse

[11] Patent Number: 5,136,392
[45] Date of Patent: Aug. 4, 1992

[54] FREQUENCY DEMODULATING CIRCUIT FOR AVOIDING BLACK REVERSING PHENOMENON

[75] Inventor: Shigeru Ganse, Kanagawa, Japan

[73] Assignee: Sony Corporation, Tokyo, Japan

[21] Appl. No.: 443,461

[22] Filed: Nov. 30, 1989

[30] Foreign Application Priority Data

Dec. 9, 1988 [JP] Japan ............... 63-3111582

[51] Int. Cl.⁵ .................. H04N 9/79; H04N 5/76
[52] U.S. Cl. .................. 358/330; 358/335; 360/33.1
[58] Field of Search ............... 358/335, 336, 337, 340, 358/310, 314, 315, 316, 317, 319, 320, 327, 329, 330, 36, 37, 166, 167; 360/36.1, 37.1, 38.1

[56] References Cited

U.S. PATENT DOCUMENTS

| | | | |
|---|---|---|---|
| 4,291,330 | 9/1981 | Hirai | 358/328 |
| 4,695,900 | 9/1987 | Honjo et al. | 358/327 |
| 4,860,105 | 8/1989 | Salcagnchi et al. | 358/340 |
| 4,906,942 | 3/1990 | Nalcai et al. | 358/327 |

*Primary Examiner*—Roy N. Envall, Jr.
*Assistant Examiner*—Thai Tran
*Attorney, Agent, or Firm*—Alvin Sinderbrand; William S. Frommer

[57] ABSTRACT

In a video reproducing apparatus having a head for reproducing a recorded frequency modulated signal and a frequency demodulator for demodulating the reproduced signal output from the head, a circuit interposed between the head and frequency demodulator comprises an adder having an input receiving the reproduced frequency modulated signal output from the head, a limiter connected between the output of the adder and the frequency demodulator for providing an amplitude limited output to the latter, and a feedback loop for also applying the amplitude limited output from the limiter to a second input of the adder so as to prevent occurrence of a reversing phenomenon and of an abnormal noise bar output, and thereby improve the reproduced picture quality.

20 Claims, 3 Drawing Sheets

FIG. 6

Vth

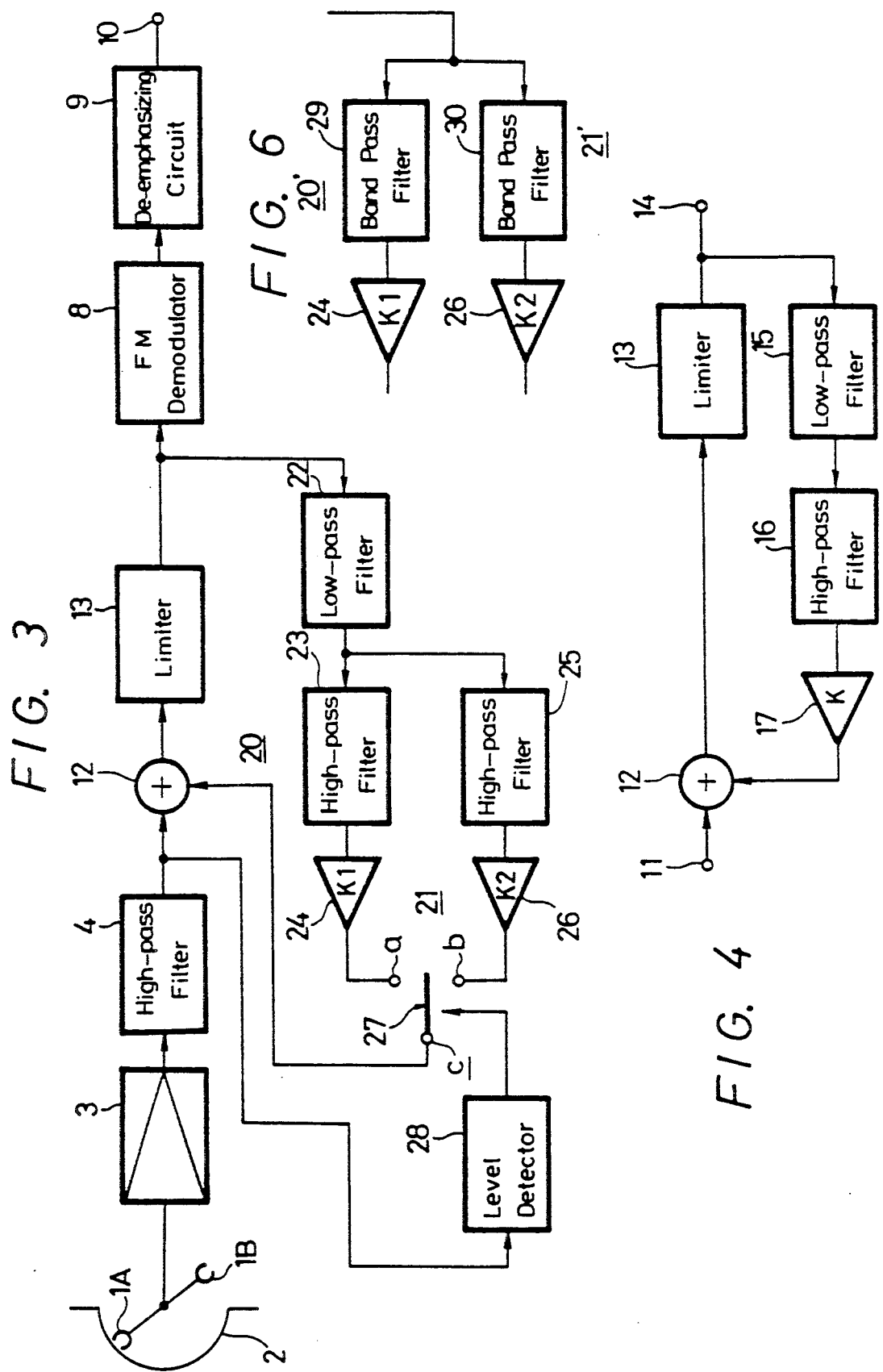

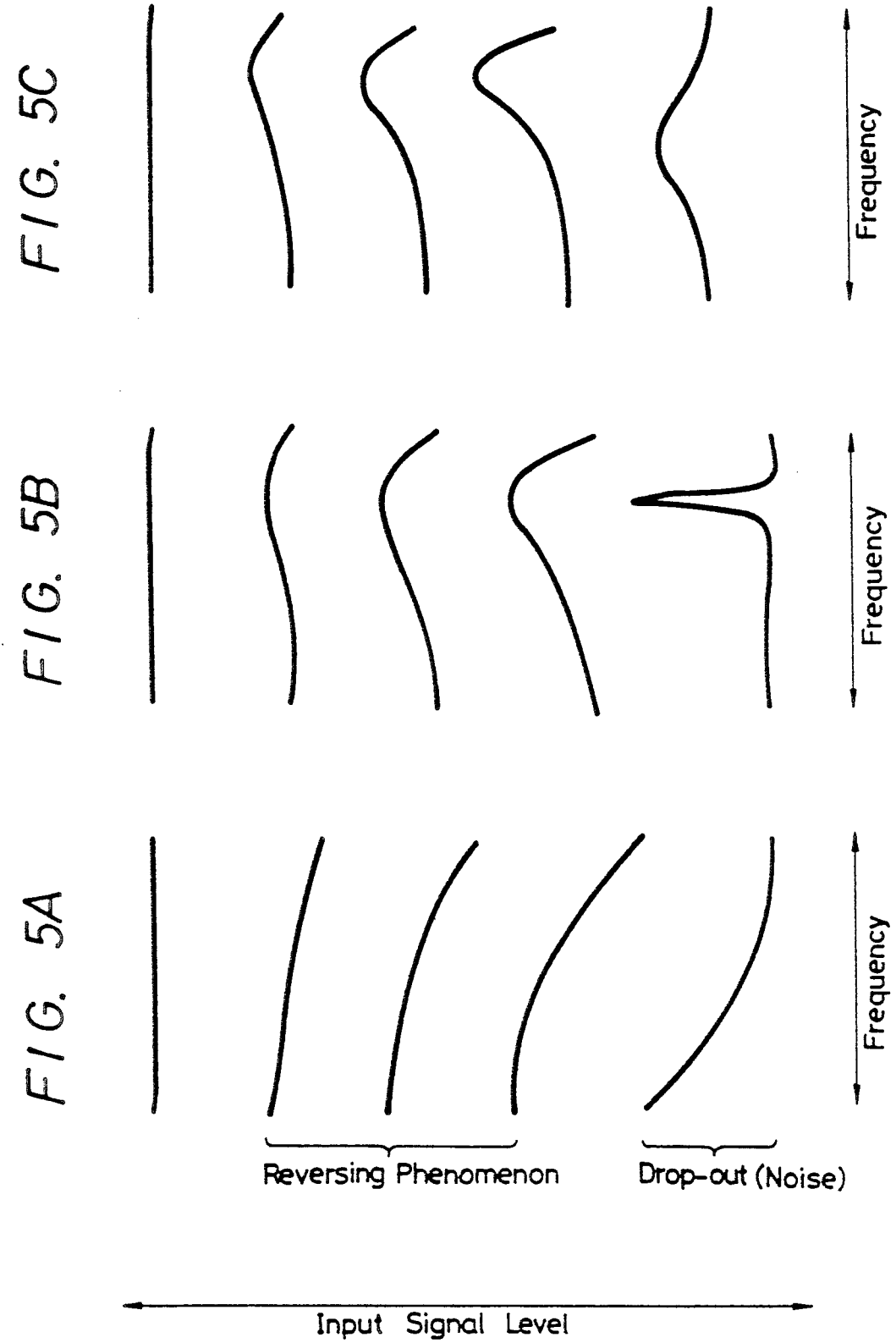

FREQUENCY DEMODULATING CIRCUIT FOR AVOIDING BLACK REVERSING PHENOMENON

BACKGROUND OF THE INVENTION

1. Field of the Invention

The present invention relates generally to demodulators for frequency modulated (FM) signals and, more particularly is directed to a frequency demodulating circuit for a video reproducing apparatus, such as, a video tape recorder (VTR).

2. DESCRIPTION OF THE PRIOR ART

In a video tape recorder according to the prior art, a luminance signal is frequency-modulated, a chrominance signal is low-frequency-converted, that is, frequency converted to a frequency band below that of the FM luminance signal, and a mixed signal composed of the FM luminance signal and the low-frequency-converted chrominance signal is supplied to rotary heads and recorded thereby in slant record tracks on a magnetic tape. In such previously proposed VTR, in a variable speed playback mode thereof, such as, a still playback mode, a slow playback mode, a high speed playback mode or the like, the reproduced signal output from each rotary head is attenuated at each portion of the recorded signal where the magnetic head or heads cannot accurately scan the respective record track or tracks, with the result that a noise band is produced on the displayed picture. In other words, when the reproduced FM luminance signal is demodulated, a noise component, for example, due to head impedance noise and/or amplifier noise, is FM-modulated. Further, such noise is of a broad band so that the demodulated amplitude thereof becomes relatively large.

In order to reduce the noise on the picture, the frequency band of the FM luminance signal being supplied to the FM demodulator may be limited to a predetermined band near the carrier frequency. If such band-limiting of the input FM luminance signal is employed, the demodulated signal will become insufficient in those portions where the level of the reproduced signal output by the head or heads is substantially low, so that a reversing phenomenon will occur.

In order to prevent such reversing phenomenon in the reproducing or playback mode of a VTR, it has been proposed to supply the reproduced FM luminance signal from the rotary head or heads through an amplitude limiter to a high-pass filter which, when the level of the reproduced FM luminance signal is lower than that limited by the amplitude limiter, is effective to enhance the high band component. Such enhanced high band component is intended to avoid a black reversing phenomenon by which the level of the high band component is lowered and a so-called zero cross is not performed, as if the frequency of the reproduced FM luminance signal was considerably lowered. Further, in accordance with the prior art, the FM luminance signal derived from the high-pass filter is further amplitude-limited by an additional limiter prior to being applied to an FM demodulator for providing the respective luminance signal. In this connection, it is to be noted that the extent to which the black reversing phenomenon can be avoided depends on the order of the mentioned high-pass filter. However, if the order of such high-pass filter is increased for ensuring effective avoidance of the black reversing phenomenon, a white reversing phenomenon is caused by the additional limiter when a FM luminance signal having a relatively low frequency is input to the high-pass filter.

OBJECTS AND SUMMARY OF THE INVENTION

Accordingly, it is an object of the present invention to provide an improved frequency demodulating circuit for a video reproducing apparatus which can avoid the above mentioned problems encountered with the prior art.

More specifically, it is an object of the present invention to provide a frequency demodulating circuit for a video reproducing apparatus in which a black reversing phenomenon can be prevented without giving rise to a white reversing phenomenon.

It is another object of the present invention to provide a frequency demodulating circuit for a video reproducing apparatus, as aforesaid, which can prevent the generation of an abnormal output due to a noise bar occurring on the reproduced picture when a magnetic head fails to precisely scan or trace record tracks on a magnetic tape in a variable speed playback mode of the video reproducing apparatus.

In accordance with an aspect of this invention, in a video reproducing apparatus having a head or heads for reproducing a recorded frequency modulated signal and a frequency demodulator for demodulating the reproduced frequency modulated signal, a circuit interposed between the head or heads and the frequency demodulator comprises an adder having an input receiving the reproduced frequency modulated signal, a limiter connected between the output of the adder and the frequency demodulator for providing an amplitude limited output to the latter, and a positive feedback loop connected between the output of the limiter and another input of the adder.

In a preferred embodiment of the invention, the positive feedback loop includes first positive feedback means including first filter means for passing a predetermined first band of frequencies and a first attenuator connected in series with the first filter means and having a predetermined gain, second positive feedback means having second filter means for passing a second band of frequencies wider than the first band and a second attenuator connected in series with the second filter means and having a gain smaller than the gain of the first attenuator, switch means for selectively connecting the first and second positive feedback means between the output of the limiter and the second or additional input of the adder, and level detecting means for detecting the level of the reproduced frequency modulated signal and for controlling the switch means in accordance with the detected level so that the first and second positive feedback means are connected between the output of the limiter and the additional input of the adder when the detected level is less than and greater than, respectively, a predetermined level.

The above, and other objects, features and advantages of the present invention, will be apparent in the following detailed description of preferred embodiments when read in conjunction with the accompanying drawings, in which the same reference numerals are used to identify the same or similar parts in the several views.

BRIEF DESCRIPTION OF THE DRAWINGS

FIG. 3 is a schematic block diagram showing a frequency demodulating circuit for video reproducing apparatus according to an embodiment of the present invention;

FIG. 4 is a schematic block diagram to which reference will be made in explaining a fundamental principle of the present invention;

FIG. 5A-5C are frequency characteristic curves to which reference will be made in explaining the operation of the frequency demodulating circuit according to the present invention; and FIG. 6 is a schematic block diagram showing a portion of the frequency demodulating circuit according to another embodiment of the present invention.

DETAILED DESCRIPTION OF THE PREFERRED EMBODIMENTS

Figure 1:
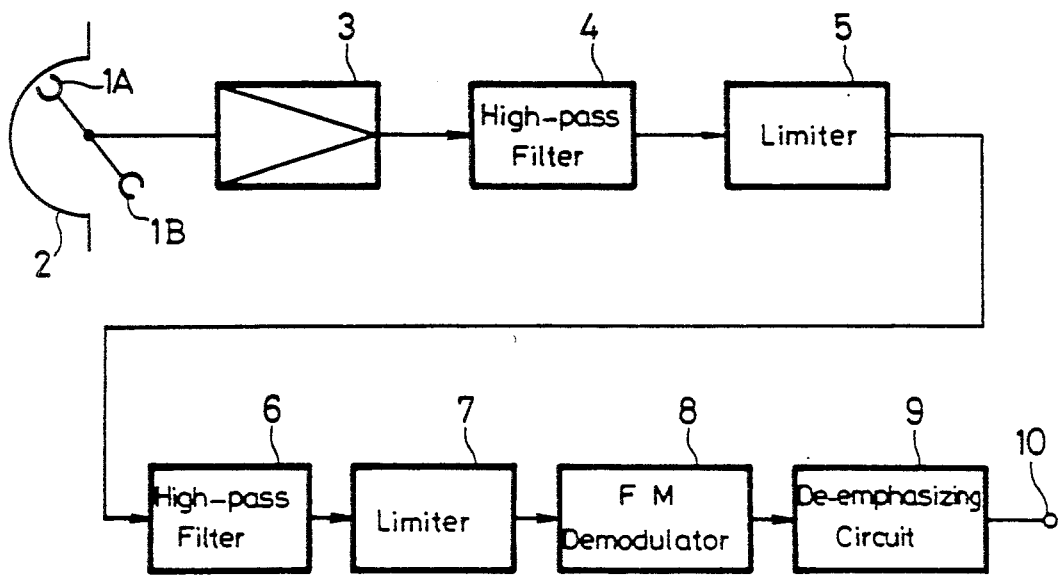
FIG. 1 is a schematic block diagram showing a frequency demodulating circuit for video reproducing apparatus according to the prior art.

Before proceeding with a detailed description of the present invention, a frequency demodulating circuit for video reproducing apparatus according to the prior art will be described with reference to FIG. 1 in order to provide a more complete understanding of the problems encountered therewith and which are overcome by the present invention. In the frequency demodulating circuit of FIG. 1, rotary magnetic heads 1A and 1B of a video reproducing apparatus are mounted at diametrically opposed positions on a tape guide drum (not shown), and have different azimuth angles. A magnetic tape 2 is helically wrapped around the tape guide drum with a wrap angle of approximately 180 degrees and is transported in the longitudinal direction of the tape at a predetermined tape speed during recording and normal reproducing operations. A mixed signal composed of an FM luminance signal and a low-frequency-converted chrominance signal is recorded by the heads 1A and 1B alternately as such heads scan or trace successive slant tracks extending obliquely across the tape.

The mixed signal thus recorded on the magnetic tape 2 is reproduced therefrom by the magnetic heads 1A and 1B in alternately scanning the successive tracks and is supplied through a preamplifier 3 to a high-pass filter 4 which separates the FM luminance signal from the reproduced signal. The FM luminance signal is amplitude-limited by a limiter 5 and is fed from the latter to a high-pass filter 6. The high-pass filter 6 is operative, when the level of the FM luminance signal passed through the filter 4 to the limiter 5 is lower than the amplitude limit established by the limiter 5, to enhance the high band component for avoiding the so-called black reversing phenomenon. In accordance with such black reversing phenomenon, the level of the high band component is lowered so that a so-called zero cross does not occur as if the frequency of the FM luminance signal was considerably lowered.

The FM luminance signal derived at the output of the high-pass filter 6, that is, the FM luminance signal whose high-band component has been enhanced to avoid the black reversing phenomenon, is further amplitude-limited by a limiter 7 prior to being fed to an FM demodulator 8. The resulting reproduced luminance signal is supplied from the demodulator 8 through a deemphasizing circuit 9 to an output terminal 10.

Figure 2A:
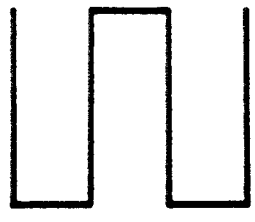
FIGS. 2A-2C are waveform diagrams of signals to which reference will be made in explaining the occurrence of the so-called white reversing phenomenon during the operation of the frequency demodulating circuit of FIG. 1.
Figure 2B:
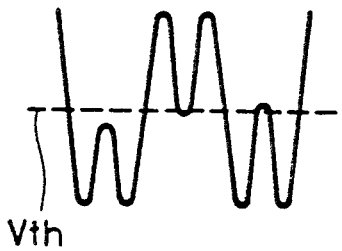
Figure 2C:
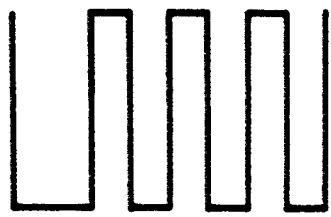

The ability of the circuit of FIG. 1 to avoid the black reversing phenomenon depends on the order of the high-pass filter 6, that is, the order of the high-pass filter 6 must be increased in order to improve the ability of the circuit to avoid the black reversing phenomenon. However, if the order of the high-pass filter 6 is thus increased, another problem is encountered. More specifically, when an FM luminance signal having a relatively low frequency is supplied to the high-pass filter 6, a ternary harmonic wave is increased by such filter, and a so-called white reversing phenomenon is caused by the following limiter 7. More specifically, when an FM luminance signal having a relatively low frequency, as shown schematically in FIG. 2A, is supplied to the high-pass filter 6 from the limiter 5, a ternary harmonic wave of the FM luminance signal is increased, as shown in FIG. 2B, by the high-pass filter 6 which has had its order increased for avoiding the black reversing phenomenon. If such FM luminance signal is supplied to the limiter 7, then some of the ternary harmonic waves will exceed a predetermined level, for example, the level indicated at Vth, so that so-called zero cross occurs. By reason of the foregoing, the limiter 7 generates an output (FIG. 2C) in which the white reversing phenomenon occurs, that is, the low frequency of the reproduced FM luminance signal is treated as though the original input signal had a high frequency. The extent to which the white reversing phenomenon occurs depends on the order of the high-pass filter 6 and the amplitude limiting level of the limiter 7. Thus, with the circuit according to the prior art as shown on FIG. 1, it is difficult to avoid both the black reversing phenomenon and the white reversing phenomenon.

The avoidance of the above problem in accordance with the present invention will now be generally explained with reference to FIG. 4 in which an input FM signal, such as, the FM luminance signal obtained from the high-pass filter 4 in FIG. 1 is shown to be supplied to an input terminal 11. The FM signal applied to the input terminal 11 is supplied to one input of an adder 12 which has its output connected through a limiter 13 to an output terminal 14 which may be, for example, connected to the frequency demodulator 8 of FIG. 1. The output signal from the limiter 13 is also applied to a feedback circuit having a low-pass filter 15, a high-pass filter 16 and an attenuator 17 connected in series to another input of the adder 12. Thus, the feedback circuit constituted by the low-pass filter 15 and the high-pass filter 16, which could be replaced by a single bandpass filter, and the limiter 17 provide a positive feedback by which the limiter 13 is controlled only in respect to the band of frequencies passed by the low-pass filter 15 and the high-pass filter 16.

A typical frequency characteristic of the FM signal applied to the input terminal 11 is illustrated in FIG. 5A. As there shown, when the level of the input FM signal is high, the frequency characteristic is relatively flat. When the level of the input FM signal is decreased, the level of the high band component thereof is reduced considerably giving rise to the so-called black reversing phenomenon. When the level of the input FM signal is further reduced, the level of the carrier is also lowered with the result that a drop-out occurs.

The purpose of the circuit shown on FIG. 4, and which generally embodies the present invention, is to avoid the black reversing phenomenon due to the lowered high band component of the frequency characteristic when the level of the input FM signal is decreased. More specifically, the circuit described with reference to FIG. 4 generally has the characteristic shown on FIG. 5B. As there shown, when the level of the input FM signal is sufficiently large, so that the limiter 13 is saturated and the amount of feedback through filters 15 and 16 and attenuator 17 to adder 12 is decreased, the characteristic of the circuit shown on FIG. 4 is substantially flat. When the level of the input FM signal is decreased, the amount of positive feedback is increased so that the high band component, that is, overshoot at the white peak side, is enhanced for causing so-called high band peaking. Therefore, the black reversing phenomenon is prevented by reason of the fact that the level of the high band component is maintained sufficiently high. In other words, the characteristics shown on FIGS. 5A and 5B are effectively mixed or combined, with the result that the output of the limiter 13 becomes substantially flat for avoiding the black reversing phenomenon.

However, with the circuit shown in FIG. 4, the amount of positive feedback may be excessive in the case where the level of the input FM signal is lower than a predetermined level, for example, as when a drop-out occurs, and there is no signal to be demodulated. In that event, an oscillating phenomenon occurs, as illustrated at the lowermost portion of FIG. 5B. Such oscillating phenomenon particularly appears in the variable speed playback mode of the VTR, that is, when the tape speed is different from that used for recording, at which time the demodulated output becomes abnormal due to the noise bar resulting from the fact that the rotary heads do not accurately trace the slant tracks in which the video signal is recorded.

Accordingly, it is the specific purpose of a preferred embodiment of the invention described below with reference to FIG. 3 to avoid the black reversing phenomenon while preventing an abnormal demodulated output due to a noise bar occurring in the variable speed playback mode of the VTR. In FIG. 3, parts of the FM demodulating circuit there illustrated which correspond to those previously described with reference to FIGS. 1 and 4 are identified by the same reference numerals and will not be further described in detail.

More specifically, the FM demodulating circuit of FIG. 3 is shown to generally comprise a first positive feedback circuit 20 and a second positive feedback circuit 21 which are alternatively connected between the output of the limiter 13 and the respective input of the adder 12. The first positive feedback circuit 20 is shown to include a low-pass filter 22, a high-pass filter 23 and an attenuator 24 connected in a series circuit, while the second positive feedback circuit 21 includes a high-pass filter 25 connected to the junction between the low-pass filter 22 and the high-pass filter 23 and an attenuator 26. Thus, the second positive feedback circuit 21 effectively includes the high-pass filter 25 and attenuator 26 connected in series with each other and in parallel with the high-pass filter 23 and attenuator 24, and also connected in series with the low-pass filter 22.

Although the first and second positive feedback circuits 20 and 21 are shown and described as sharing the low-pass filter 22, the same effects may be achieved by providing the circuits 20 and 21 with separate or independent low-pass filters (not shown) in place of the filter 22.

Further, as shown in FIG. 6, it will be appreciated that the low-pass filter 22 and the high-pass filter 23 may be replaced by a band pass filter 29 in the first positive feedback circuit 20', while the low-pass filter 22 and the high-pass filter 25 are replaced by a corresponding band pass filter 30 in the second positive feedback circuit 21'.

The cut-off frequency of the low-pass filter 22 in FIG. 3 is selected to be higher than the maximum frequency of the FM luminance signal separated by the high-pass filter 4 from the reproduced video signal, and the cut-off frequency of the high-pass filter 23 is selected to be lower than such maximum frequency of the input FM luminance signal while the cut-off frequency of the high-pass filter 25 is selected to be lower than the cut-off frequency of the high-pass filter 23. Further, the gain K1 of the attenuator 24 is selected to be greater than the gain K2 of the attenuator 26.

Similarly, in the embodiment shown in FIG. 6, the gain K1 of the attenuator 24 is greater than the gain K2 of the attenuator 26, and the bandwidth of the frequencies passed by the filter 29 in the first feedback circuit 20' is smaller than the bandwidth of the frequencies passed by the filter 30 in the feedback circuit 21'. The foregoing can be realized by providing the bands of frequencies passed by the filters 29 and 30, respectively, with substantially the same maximum frequencies higher than the maximum frequency of the input FM luminance signal, while the minimum frequency of the band passed by the filter 30 is lower than the minimum frequency of the band of frequencies passed by the filter 29.

Referring again to FIG. 3, it will be seen that the outputs of the attenuators 24 and 26 in the feedback circuits 20 and 21, or 20' and 21', are connected to fixed contacts a and b of a switch circuit 27 which has its movable contact or output c connected to a respective input of the adder 12. A level detector circuit 28 is operative to detect the level of the FM luminance signal at the output of the high-pass filter 4 and to control the switching operation of the switch circuit 27 in accordance with such detected level, as explained more fully below.

When the level of the envelope of the output of the high-pass filter 4 detected by the level detector circuit 28 exceeds a predetermined level, the resulting output of detector circuit 28 causes the movable contact c of the switch circuit 27 to engage the fixed contact b so that the positive feedback circuit 21 is connected between the output of the limiter 13 and the respective input of the adder 12. On the other hand, when the level of the detected output from the high-pass filter 4 becomes less than the predetermined level, for example, an output level characteristic of a drop-out and from which no demodulated output would be generated, the detector circuit 28 causes the switch circuit 27 to engage its fixed contact a so that the positive feedback circuit 20 is then connected between the limiter 13 and the respective input of the adder 12.

The operation of the frequency demodulating circuit of FIG. 3 will now be explained with reference to FIG. 5C which illustrates characteristics associated with the first and second positive feedback circuits 20 and 21. More specifically, when the level of the input FM signal from the high-pass filter 4 is less than the predetermined level at which the level detector circuit 28 causes the switch circuit 27 to engage its fixed contact b, that is, as long as the switch circuit 27 continues to engage its contact a, and thereby render operative the first positive feedback circuit 20, the limiter 13 is saturated and the amount of the feedback is decreased so that the characteristic of the frequency demodulating circuit is substantially flat. When the level of the input FM signal is increased, but is still not greater than the predetermined level at which the level detector circuit 28 causes the switch circuit 27 to change-over from engagement with its contact a to engagement with the contact b, the first positive feedback circuit 20 remains operative. Therefore, in response to such increase in the level of the input FM signal, the amount of positive feedback through the first positive feedback circuit 20 is increased, and the high-band region, that is, overshoot at the white peak side, is enhanced for achieving high-band peaking. By reason of the foregoing, the level of the high-band component is maintained sufficiently high so that the black reversing phenomenon is avoided. In other words, at the output side of the limiter 13, the characteristics shown on FIG. 5A and FIG. 5C are, in effect, combined to provide a substantially flat combined characteristic by which the black reversing phenomenon is avoided.

When the level of the input FM signal is further increased so as to exceed the predetermined level, the level detector circuit 28 responds thereto by causing change-over of the switch circuit 27 so that its movable contact c engages the feedback circuit 21. The cut-off frequencies of the low-pass filter 22 and the high-pass filter 25 are selected so that such filters, when the feedback circuit 21 is operative, effect high-band peaking near the center of the frequency characteristic while the gain constant K2 of the attenuator 26 is selected so as to avoid oscillation. In other words, the second positive feedback circuit 21 does not cause the oscillating phenomenon shown in the lowermost portion of FIG. 5B, as will be apparent from the waveform shown at the lower portion of FIG. 5C. At the time of the change-over of the switch circuit 27 for making operative the feedback circuit 21 in place of the feedback circuit 20, the noise bar may look like so-called white noise. In that event, if the output level lies within the range between the black and white levels, the gain K2 of the attenuator 26 may be increased for permitting some oscillation under the conditions prescribed by the waveform appearing at the lowermost portion of FIG. 5C. In that case, an examination of the output of the frequency demodulator 8 will show the noise bar appearing as a gray single signal.

As earlier described, in accordance with the prior art the enhancement by the high-pass filter 6 (FIG. 1) is made constant regardless of the level of the input FM signal and, as a result thereof, the white reversing phenomenon arises. However, according to the present invention, the enhancement by the high-pass filter 16, 23 or 25 in the positive feedback circuit is varied by changing the amount of feedback in response to the level of the input FM signal. Therefore, the present invention advantageously avoids the white reversing phenomenon.

Furthermore, in the preferred embodiment of the invention shown in FIG. 3, the first and second feedback circuits 20 and 21 are selectively connected between the limiter 13 and the adder 12 so that, when the level of the input FM signal is less than a predetermined level, the first-positive feedback circuit 20 is selected to avoid the appearance of the reversing phenomenon and, when the level of the input FM signal is higher than the predetermined level, the second positive feedback circuit 21 is selected to cause the average level of the noise bar of the input FM signal to fall within a predetermined level range. Thus, the effectiveness in preventing the black reversing phenomenon can be increased without encountering the white reversing phenomenon. Furthermore, an abnormal noise bar output can be avoided in the variable speed playback mode so that the image quality of the reproduced picture is substantially improved.

Although preferred embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a video reproducing apparatus having head means for reproducing a recorded frequency modulated signal and a frequency demodulator for demodulating the reproduced frequency modulated signal from said head means, a circuit interposed between said head means and said frequency demodulator comprising:

an adder having first and second inputs and an output, said first input receiving said reproduced frequency modulated signal from said head means; a limiter connected between said output of the adder and said frequency demodulator for providing an amplitude limited frequency modulated signal to the latter; and feedback loop means for feeding back a high band component of said amplitude limited frequency modulated signal from said output of said limiter to said second input of the adder.

2. A video reproducing apparatus according to claim 1; in which said feedback loop means includes filter means for separating said high band component from said amplitude limited frequency modulated signal and attenuator means for accentuating said high band component.

3. A video reproducing apparatus according to claim 2; in which said filter means defines at least one band of frequencies including said high band component that can pass therethrough to said attenuator means.

4. A video reproducing apparatus according to claim 2; in which said filter means includes band pass filter means for passing a band of frequencies including said high band component.

5. A video reproducing apparatus according to claim 2; in which said filter means includes a low pass filter and a high pass filter connected in series. that can pass 6. In a video reproducing apparatus having head means for reproducing a recorded frequency modulated signal and a frequency demodulator for demodulating the reproduced frequency modulated signal from said head means, a circuit interposed between said head means and said frequency demodulator comprising:

an adder having first and second inputs and an output, said first input receiving said reproduced frequency modulated signal from said head means; a limiter connected between said output of the adder and said frequency demodulator for providing an amplitude limited frequency modulated signal to the latter; and feedback loop means for feeding back a high band component of said amplitude limited frequency modulated signal from said output of said limiter to said second input of the adder, said feedback loop means including first and second positive feedback means having different characteristics, and switch means for selectively connecting one of said first and second feedback means between said output of the limiter and said second input of the adder.

7. A video reproducing apparatus according to claim 6; further comprising level detecting means for detecting the level of said reproduced frequency modulated signal applied to said first input of the adder and for controlling said switch means in accordance with the detected level.

8. A video reproducing apparatus according to claim 7; in which said first positive feedback means includes first filter means passing a first predetermined band of frequencies having a minimum frequency lower than a predetermined maximum frequency of said reproduced frequency modulated signal from said head means, and first attenuator means having a first gain; and said second positive feedback means includes second filter means passing a second predetermined band of frequencies having a minimum frequency lower than said minimum frequency of said first band of frequencies, and second attenuator means having a second gain smaller than said first gain.

9. A video reproducing apparatus according to claim 8; in which said first and second bands of frequencies have substantially equal maximum frequencies higher than said maximum of the reproduced frequency modulated signal from said head means.

10. A video reproducing apparatus according to claim 9; in which said level detecting means causes said switch means to connect said first and second positive feedback means between said output of the limiter and said second input of the adder when said detected level is less than and greater than, respectively, a predetermined level.

11. A video reproducing apparatus according to claim 10; in which said predetermined level is characteristic of a drop out in said reproduced frequency modulated signal from said head means.

12. A video reproducing apparatus according to claim 6; in which said first positive feedback means includes a low-pass filter, a first high-pass filter and a first attenuator in a series circuit; and said second positive feedback means includes a second high-pass filter connected to said low-pass filter in parallel with said first high-pass filter, and a second attenuator in series with said second high-pass filter.

13. A video reproducing apparatus according to claim 12; further comprising level detecting means for detecting the level of said reproduced frequency modulated signal applied to said first input of the adder and for controlling said switch means in accordance with the detected level.

14. A video reproducing apparatus according to claim 12; in which said first attenuator has a gain larger than a gain of said second attenuator.

15. A video reproducing apparatus according to claim 12; in which said first high-pass filter has a cut-off frequency higher than a cut-off frequency of said second high-pass filter.

16. A video reproducing apparatus according to claim 6; in which said first positive feedback means includes a first bandpass filter and a first attenuator, and said second positive feedback means includes a second bandpass filter and a second attenuator.

17. A video reproducing apparatus according to claim 16; further comprising level detecting means for detecting the level of said reproduced frequency modulated signal applied to said first input of the adder and for controlling said switch means in accordance with the detected level.

18. A video reproducing apparatus according to claim 16; in which said first attenuator has a gain larger than a gain of said second attenuator.

19. A video reproducing apparatus according to claim 16; in which said first bandpass filter has a band width narrower than a band width of said second bandpass filter.

20. In a video reproducing apparatus having head means for reproducing a recorded frequency modulated signal and a frequency demodulator for demodulating the reproduced frequency modulated signal from said head means, a circuit interposed between said head means and said frequency demodulator comprising:

an adder having first and second inputs and an output, said first input receiving said reproduced frequency modulated signal from said head means;

a limiter connected between said output of the adder and said frequency demodulator for providing an amplitude limited output to the latter;

first positive feedback means including first filter means for passing a predetermined first band of frequencies, and a first attenuator connected in series with said first filter means and having a predetermined gain;

second positive feedback means including second filter means for passing a second band of frequencies wider than said first band, and a second attenuator connected in series with said second filter means and having a gain smaller than said gain of the first attenuator;

switch means for selectively connecting said first and second positive feedback means between said output of the limiter and said second input of the adder; and level detecting means for detecting the level of said reproduced frequency modulated signal applied to said first input of the adder and for controlling said switch means in accordance with the detected level so that said first and second positive feedback means are connected between said output of the limiter and said second input of the adder when said detected level is less than and greater than, respectively, a predetermined level.

* * * * *